US012717446B1

(12) United States Patent
Ahuja et al.

(10) Patent No.: US 12,717,446 B1
(45) Date of Patent: Aug. 25, 2026

(54) SURFACE TAP AND TOUCH LOCALIZATION USING THERMAL SENSORS

(71) Applicant: GOOGLE LLC, Mountain View, CA (US)

(72) Inventors: Karan Ahuja, Seattle, WA (US); Mar Gonzalez Franco, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/198,925

(22) Filed: May 5, 2025

(51) Int. Cl.
*G06F 3/041* (2006.01)
*G06F 3/042* (2006.01)

(52) U.S. Cl.
CPC .......... *G06F 3/0425* (2013.01); *G06F 3/0416* (2013.01)

(58) Field of Classification Search
None
See application file for complete search history.

(56) References Cited

U.S. PATENT DOCUMENTS

2013/0088422 A1* 4/2013 Niikura ................. G06F 3/0304 345/156
2021/0117042 A1* 4/2021 Kurz ....................... G06F 3/011
2022/0276698 A1 9/2022 Wang et al.
2024/0061532 A1 2/2024 Kurz

OTHER PUBLICATIONS

Ding, et al., "Thermohands: a Benchmark for 3D Hand Pose Estimation From Egocentric Thermal Image", arXiv:2403.09871v1, Mar. 14, 2024, 20 pages.
Faltaous, et al., "Heatgoggles: Enabling Ubiquitous Touch Input Through Head-Mounted Devices Using Thermal Imaging", Mum 2022, Dec. 29, 2022, 4 pages.
Saba, et al., "Dante Vision: In-Air and Touch Gesture Sensing for Natural Surface Interaction With Combined Depth and Thermal Cameras", https://www.researchgate.net/publication/261333138_Dante_vision_In air_and_touch_gesture_sensing_for_natural_surface_interaction_with_combined_depth_and_thermal_cameras, Jan. 2012, pp. 167-170.

* cited by examiner

*Primary Examiner* — Krishna P Neupane
(74) *Attorney, Agent, or Firm* — BRAKE HUGHES BELLERMANN LLP

(57) ABSTRACT

A method includes determining a pose of a portion of a user relative to a surface. The surface is associated with a virtual interface generated by a device worn by the user. The method further includes receiving thermal data indicating contact between the portion of the user and a portion of the surface. The method further includes determining a location of the contact relative to the virtual interface using the thermal data. The method further includes determining a type of interaction associated with the contact using the thermal data.

20 Claims, 5 Drawing Sheets

SURFACE TAP AND TOUCH LOCALIZATION USING THERMAL SENSORS

BACKGROUND

An extended reality (XR) device incorporates a spectrum of technologies that blend physical and virtual worlds, including virtual reality (VR), augmented reality (AR), and mixed reality (MR). These devices immerse users in digital environments, either by blocking out the real world (VR), overlaying digital content onto the real world (AR), or blending digital and physical elements seamlessly (MR). XR devices include glasses, headsets, or screens equipped with sensors, cameras, and displays that utilize the movement of users and their surroundings to deliver immersive experiences across various applications such as gaming, education, healthcare, on-the-go computing, and industrial training.

SUMMARY

In an aspect, a method includes determining a pose of a portion of a user relative to a surface. The surface is associated with a virtual interface generated by a device worn by the user. The method further includes receiving thermal data indicating contact between the portion of the user and a portion of the surface. The method further includes determining a location of the contact relative to the virtual interface using the thermal data. The method further includes determining a type of interaction associated with the contact using the thermal data.

In another aspect, a computing system includes a computer-readable storage media, at least one processor operatively coupled to the computer-readable storage media, and program instructions stored on the computer-readable storage media. When the program instructions are executed by the at least one processor, the at least one processor is directed to perform a method. The method includes determining a pose of a portion of a user relative to a surface. The surface is associated with a virtual interface generated by a device worn by the user. The method further includes receiving thermal data indicating contact between the portion of the user and a portion of the surface. The method further includes determining a location of the contact relative to the virtual interface using the thermal data. The method further includes determining a type of interaction associated with the contact using the thermal data.

In another aspect, a computer-readable storage medium has program instructions stored thereon. When the program instructions are executed by at least one processor, the at least one processor is directed to perform a method. The method includes determining a pose of a portion of a user relative to a surface. The surface is associated with a virtual interface generated by a device worn by the user. The method further includes receiving thermal data indicating contact between the portion of the user and a portion of the surface. The method further includes determining a location of the contact relative to the virtual interface using the thermal data. The method further includes determining a type of interaction associated with the contact using the thermal data.

DETAILED DESCRIPTION

Figure 1:
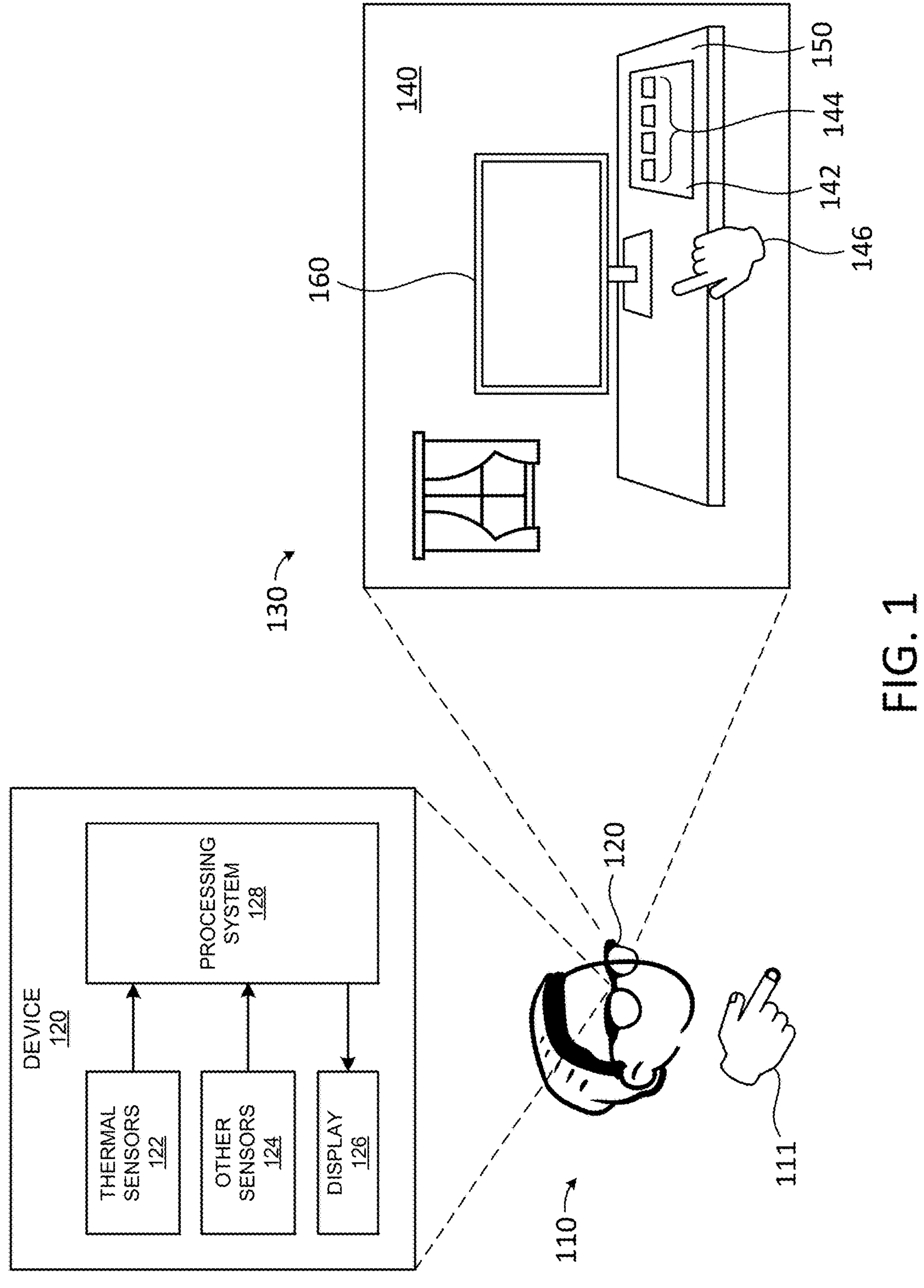
FIG. 1 is a block diagram of an example of a computing environment for surface tap and touch localization in accordance with the present disclosure.

Computing devices, such as wearable devices and extended reality (XR) devices, provide users an effective tool for gaming, training, education, healthcare, mobile computing, and more. An XR device merges the physical and virtual worlds, encompassing virtual reality (VR), augmented reality (AR), and mixed reality (MR) experiences. These devices can include headsets or glasses equipped with sensors, cameras, and displays that utilize users' movements and surroundings, allowing them to interact with digital content. XR devices offer immersive experiences by either completely replacing the real world with a virtual one (e.g., VR), overlaying digital information onto the real world (e.g., AR), or seamlessly integrating digital and physical elements (e.g., MR).

Input to XR devices may be provided through gestures, voice commands, controllers, eye movements, and the like. Users are able to interact with the virtual environment by manipulating objects, navigating menus, and triggering actions using these input methods, which are translated by the device's sensors and algorithms into corresponding digital interactions within the XR environment. To illustrate, an XR device may display a virtual user interface within the XR environment that is overlaid on a physical, real-world surface. The user may provide inputs to the XR device by interacting with the real-world surface on which virtual user interface is displayed, for example via taps, touches, or other interactive gestures on the surface. These gestures may emulate interactions with the user interfaces of real-world devices, such as capacitive touch screens of mobile devices.

At least one technical problem with user interactions with virtual user interfaces, such as those provided within XR environments, is that they often suffer from inaccuracies due to occlusions, complex hand poses, unknown surface locations, or a combination thereof. These inaccuracies can result in input errors, the performance of incorrect or undesired actions within an application, and so on, which can frustrate a user and compromise the immersive experience.

At least some of the technical solutions described herein may be configured to enhance the accuracy and localization of a user's tap and touch interactions with virtual user interfaces displayed on real-world surfaces within an XR environment. In some implementations, accuracy and localization of such interactions can be enhanced using thermal imaging data, for example provided by thermal imaging sensors (e.g., thermal cameras) integrated into a wearable XR device.

In some implementations, the systems and methods described herein may leverage thermal signatures generated by user contact (e.g., via a finger) with a real-world surface, on which a virtual user interface is displayed, to detect tap and touch events and to pinpoint their locations on the surface, even in low-light conditions and/or when the gestures are at least partially occluded, for instance when all or a portion of a user's finger is obscured from view relative to one or more image sensors (e.g., image cameras) of an XR device.

In some implementations, by analyzing a thermal differential between a portion of the user that is interacting with the surface (e.g., a finger) prior to and after contact, tap and touch interactions with the surface can be accurately identified and localized, thereby overcoming limitations of known RGB/Depth vision-based techniques. The systems and methods described herein may be implemented, for example, within XR or VR systems such as, for example, augmented reality (AR) glasses, head mounted display (HMD) devices, and the like. More generally, the systems and methods described herein may be implemented in any type of computing system.

At least one technical benefit of these technical solutions is the significant enhancement of user interactions within XR environments, by enabling more natural, intuitive, and precise tap and touch-based virtual user interfaces, such as keyboards, trackpads, and so on, and extending to other user interactions within XR environments. For example, enhancing the accuracy of user interactions with virtual user interfaces may enable enhanced user productivity and may promote and/or sustain user immersion with the XR environment.

FIG. 1 illustrates an example implementation of a computing environment 100 for surface tap and touch localization. In some implementations, the computing environment 100 enables interactions with one or more virtual interfaces, such as virtual user interfaces, displayed within an XR environment. The one or more virtual user interfaces may be displayed such that they correspond to respective real-world surfaces, such that a user may interact with a virtual user interface through physical interaction with a corresponding portion of a real-world surface associated with the virtual interface. For example, a virtual user interface may be overlaid upon a real-world surface within the XR environment.

In the illustrated implementation, the computing environment 100 includes a user 110, a device 120, and an image 130 displayed to the user 110 by the device 120. The image 130 is a representation of an environment 140, such as an XR environment, that may include images of physical, real-world objects and virtual objects that are created, placed, and managed within the environment 140 by the device 120.

In some implementations, the device 120 may be provided as an XR device, such as a pair of AR glasses, an HMD device, or the like. As shown, the device 120 may be provided with components including thermal sensors 122, other sensors 124, one or more displays 126, and a processing system 128.

In an implementation, the device 120 includes one or more thermal sensors 122. For example, the thermal sensors 122 may be provided as thermal imaging devices, such as cameras that detect and visualize heat present in objects, converting infrared radiation into visible images. In this regard, the thermal sensors 122 are capable of collecting thermal data of objects in the environment 140, such as portions of the user 110, surfaces of physical objects, and the like. The thermal sensors 122 may convert sensed infrared energy into one or more electronic signals, which are then processed, for example by the processing system 128.

In some implementations, the device 120 may include one or more other sensors 124. The other sensors 124 may include one or more image sensors (e.g., RGB cameras), gyroscopes, accelerometers, magnetometers, depth sensors, and audio sensors (e.g., microphones), in any combination. The other sensors 124 are configured to sense and collect data relative to the user 110 and the environment 140, and to provide the data to processing system 128. In some implementations, one or more of the other sensors 124, such as one or more accelerometers, gyroscopes, and/or magnetometers, may be configured to collectively function as an inertial measurement unit (IMU) of the device 120. The IMU may be configured to measure a wide range of motion, including linear acceleration, angular velocity, and orientation, for example. In some implementations, the device 120 may be configured to combine data sensed by one or more of the other sensors 124 (e.g., image depth data, IMU data, etc.) with thermal data sensed by the thermal sensors 122.

The display 126 of the device 120 may be provided as a screen or projection surface that presents immersive visual content of the environment 140 to the user 110. The display 126 may be configured to merge virtual objects with the physical, real-world objects in the environment 140. Example implementations of the display 126 can include optical see-through displays (e.g., lenses of AR glasses or XR glasses) or video pass-through (e.g., screens in an MR device or VR device).

The processing system 128 of the device 120 may include one or more processors, such as central processing units (CPUs), graphics processing units (GPUs), specialized artificial intelligence (AI) processors, and the like. The processing system 128 may include one or more processors that reside in the device 120 (e.g., AR glasses, HMD device, etc.), one or more processors or devices that are communicatively coupled to and share processing load with the device 120, such as processors of a mobile device (e.g., mobile phone, laptop, etc.), server processors, cloud-based processors, or the like, in any combination.

In some implementations, the processing system 128 is configured to analyze thermal data provided by the thermal sensors 122 and/or data provided by one or more of the other sensors 124 to identify and/or localize contact (e.g., tap and touch interactions) between the user 110 and physical, real-world surfaces associated with virtual objects (e.g., virtual user interfaces) in the environment 140.

In accordance with the illustrated implementation of the computing environment 100, the device 120 displays an image 130 to the user 110 that includes physical, real-world objects and virtual objects in the environment 140. As shown, the device 120 displays a virtual user interface 142 on a surface 150 of a physical object in the environment 140. The virtual user interface 142 may include one or more, such a plurality, of control elements 144. Interaction by the user 110 with the control elements 144 may cause one or more processes to be performed, for example within an application that is executing on the device 120 or on a device 160 in the environment 140 that is separate from, and communicatively coupled to, the device 120. The device 160 may be, for example, a personal computer (PC), a laptop, a display device (e.g., display screen), or the like.

The device 120 may also display one or more graphical representations within the environment 140 that correspond to respective real-world portions of the user 110. For example, as shown, the environment 140 includes a virtual hand 146 that corresponds to a hand 111 of the user 110. The device 120 is configured to detect and observe movement of the hand 111 of the user 110, for example using data sensed by the thermal sensors 122, and to update the displayed position and orientation of the virtual hand 146 within the environment 140 accordingly. The position and orientation of the hand 111 of the user 110 may be referred to as a pose of the hand 111. The device 120 may optionally supplement the thermal data with data provided by one or more of the other sensors 124 in updating positioning and orientation of the virtual hand 146.

Figure 2:
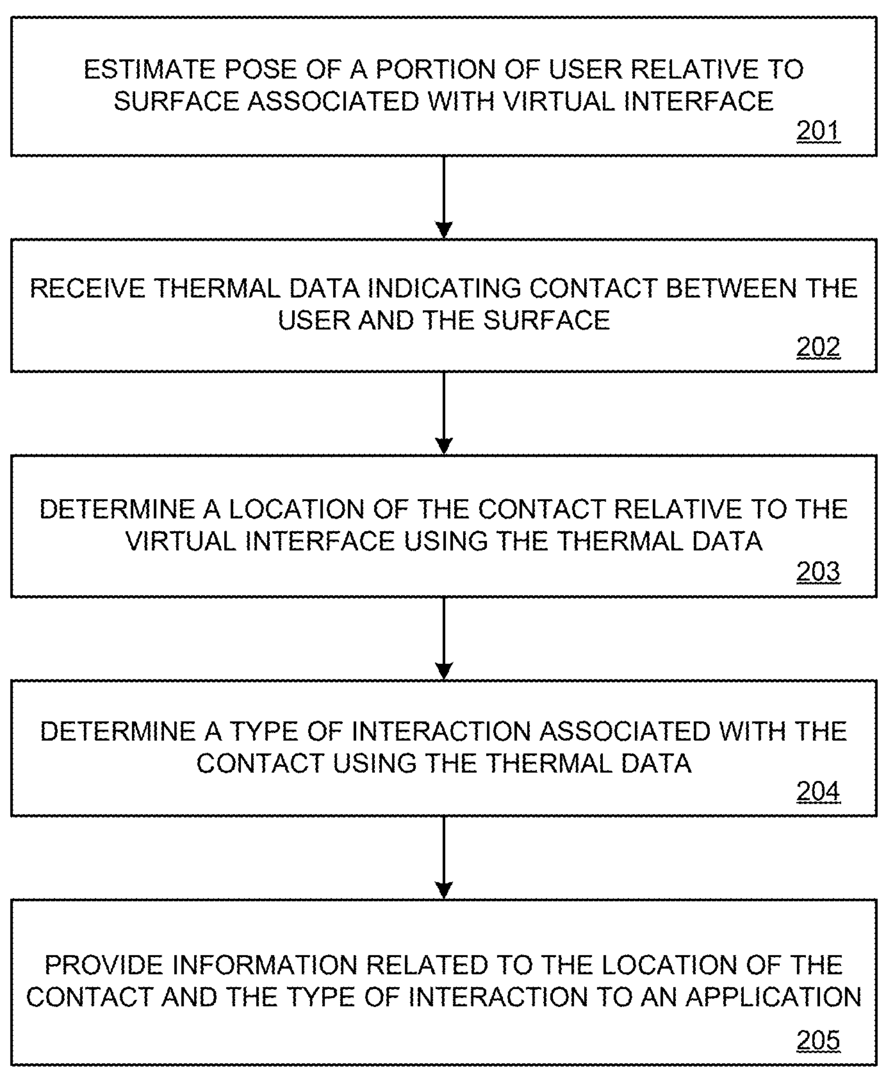
FIG. 2 is a block diagram of an example of a process for surface tap and touch localization in accordance with the present disclosure.

FIG. 2 is a block diagram of a process 200 for performing surface tap and touch localization, for example within an XR environment. For the purposes of illustration, the process 200 is described with reference to an implementation using systems and components of the computing environment 100. Additionally, FIGS. 3A-3D illustrate an example of the user 110 interacting with the virtual user interface 142 in accordance with the process 200.

In some implementations of the process 200, the device 120 may be a wearable device worn by the user 110, such as AR glasses, XR glasses, an HMD, or the like. As shown, the device 120 is operating and displaying the image 130 of the environment 140 to the user 110, via the display 126. The environment 140 may be an AR environment, an MR environment, an XR environment, or another type of environment, for example.

The environment 140 includes the virtual user interface 142 displayed on the surface 150. As shown, the surface 150 may be a planar surface, such as an upper surface of a desk or a table within reach of the user 110, for example. The environment 140 further includes one or more virtual representations of respective portions of the user 110, such as portions of the user's body. For example, as shown the environment 140 includes the virtual hand 146 as a virtual representation of the hand 111 of the user 110.

At step 201 the process 200 determines a pose of the hand 111 of the user 110 that corresponds to the virtual hand 146, relative to the virtual user interface 142 and to the surface 150. In this regard, step 201 includes determining a pose of at least a portion of the user 110 relative to the surface 150 associated with the virtual user interface 142 generated by the device 120. In some implementations, the pose of the hand 111 includes respective positions and orientations (e.g., in real-world three-dimensional space) of one or more fingers of the hand.

In some implementations, the process 200 determines the pose of the hand 111 using thermal imaging data received from the thermal sensors 122 of the device 120. In some implementations, process 200 may supplement the thermal imaging data with data received from one or more of the other sensors 124 of the device 120 in determining the pose of the hand 111. Supplementing thermal data with data from other sensors, for example via multimodal fusion of data, may improve accuracy of tap and touch localization. In an example of supplementing thermal data, the process 200 may combine the thermal data (e.g., thermal imaging data) with data from one or more other sensors, such as image data received from one or more cameras (e.g., RGB cameras) of the device 120, depth data received from one or more depth cameras of the device 120, IMU data, or other data sensed by the device 120, in any combination. In another example of supplementing thermal data, the process 200 may use image stabilization techniques, for instance to mitigate effects of hand tremors and/or other sources of noise.

The process 200 may use the thermal imaging data and/or supplemented thermal imaging data to estimate the pose of the hand 111 using various techniques. For example, in some implementations, the process 200 may perform contour model-based hand gesture recognition on the thermal imaging data and/or supplemented thermal imaging data to estimate the pose of the hand 111.

In some implementations, the process 200 may provide the thermal imaging data and/or supplemented thermal imaging data to a machine learning model trained on thermal data and/or visual data to estimate the pose of the hand 111. The machine learning model may be implemented as a Recurrent Neural Network (RNN), such as a Long Short-Term Memory (LSTM) or a Gated Recurrent Unit (GRU), as a Temporal Convolutional Network (TCN), or another temporal neural network. In some implementations, training the machine learning model may include comprehensive data collection across diverse surfaces and/or environments, for example labeled with event types (e.g., tap, touch, gesture, or the like). Feature extraction may be used to transform raw thermal data into meaningful inputs, such as finger keypoint temperatures, temperature differentials, rate of temperature change, keypoint trajectories (e.g., including positions, velocity, acceleration of the finger keypoint), or the like. The extracted features may be fed into the machine learning model, capturing temporal dependencies and spatial-temporal patterns. Data may be processed in a rolling buffer, with temporal windows fed into the model for real-time predictions.

As a result of step 201, the process 200 identifies one or more hand keypoints that correspond to portions of the hand 111, such as individual fingers or portions of fingers (e.g., finger tips). For example, each of the identified hand keypoints may correspond to a specific, identifiable point on the hand 111, and may be used to represent respective positions and/or orientations of the fingers, the wrist, and/or other portions of the hand 111 in physical, three-dimensional space. Hand keypoints that represent positions and/or orientations of respective fingers, such as the respective tips of the fingers, may be referred to as finger keypoints.

Figure 3A:
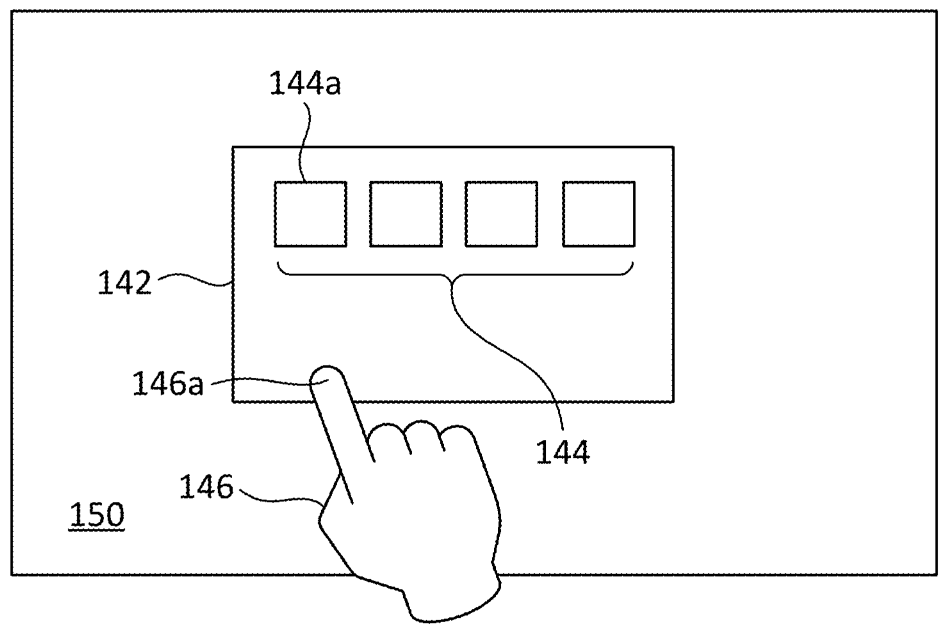
FIGS. 3A-3D depict an example of user interaction with a virtual interface in accordance with the process illustrated in FIG. 2.

In some implementations, the process 200 continuously monitors one or more hand keypoints over time. For example, the process 200 may continuously monitor movements of the hand keypoints in physical, three-dimensional space, by analyzing velocity data and/or acceleration data received from the thermal sensors 122 and/or the other sensors 124, and may update virtual representations of the hand keypoints in the environment 140, such as the virtual hand 146, accordingly. The process 200 can monitor for movements of the hand keypoints that indicate a potential for interaction of the user 110 with the virtual user interface 142. For example, the process 200 may observe movement of the hand 111 toward the virtual user interface 142 and/or may observe the hand 111 re-orient into an interactive pose, for example with a finger extended (e.g., as shown in FIG. 3A).

In some implementations, the process 200 may continuously monitor one or more temperature differentials between real-world objects by analyzing thermal data, such as thermal imaging data, provided by the thermal sensors 122. For example, the process 200 can continuously monitor respective temperature differentials between one or more of the identified hand keypoints and the surface 150 upon which the virtual user interface 142 is displayed within the environment 140. To illustrate, the surface 150 may exhibit a first temperature, and a portion of the hand 111 that is associated with a finger keypoint, such as a back of a finger, may exhibit a second temperature that is different from the first temperature, such that a temperature differential exists between the surface 150 and the portion of the hand 111.

The temperature differential may be monitored based on thermal data provided by the thermal sensors 122. The thermal data may include, for example, thermal imaging data sensed by the thermal sensors 122. The thermal imaging data may include respective amounts of infrared radiation emitted by the portion of the hand 111 and the surface 150 and. Contact of the portion of the hand 111 with the surface 150 results in heat transfer therebetween, which effects a change in the temperature differential between the surface 150 and the portion of the hand 111. For example, heat transfer that occurs during the contact may change the first temperature of the surface 150 and the second temperature of the portion of the hand 111, thereby changing the temperature differential. To illustrate, while contact is maintained the first temperature of the surface 150 may be elevated and/or the second temperature of the portion of the hand 111 may be lowered. These temperature changes may cause the temperature differential to be lowered, for example compared to an ambient value.

The process 200 may continuously monitor temperature differentials by analyzing thermal data, such as thermal imaging data received from the thermal sensors 122, to detect heat transfers and/or changes in infrared radiation emissions associated with contact between the surface 150 and one or more portions of the hand 111 that are associated with corresponding hand keypoints.

Figure 3B:
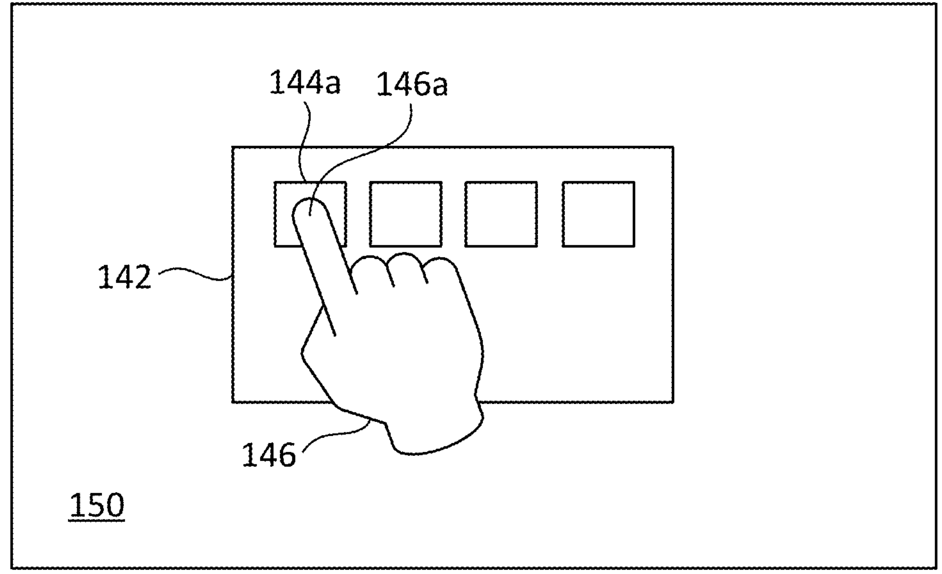

At step 202, the process 200 receives thermal data that is indicative of a portion of the hand 111 associated with a finger keypoint 146*a* making contact with the surface 150 (e.g., as shown in FIG. 3B). To illustrate, the process 200 may receive thermal data indicating that heat transfer is occurring between a portion 152 of the surface 150 and the finger keypoint 146*a*. For example, the thermal data may indicate an increase in temperature of the portion 152 relative to an ambient temperature of the surface 150. The process 200 may analyze the thermal data to determine a change in a temperature differential between the finger keypoint 146*a* and the portion 152 of the surface 150.

Figure 3C:
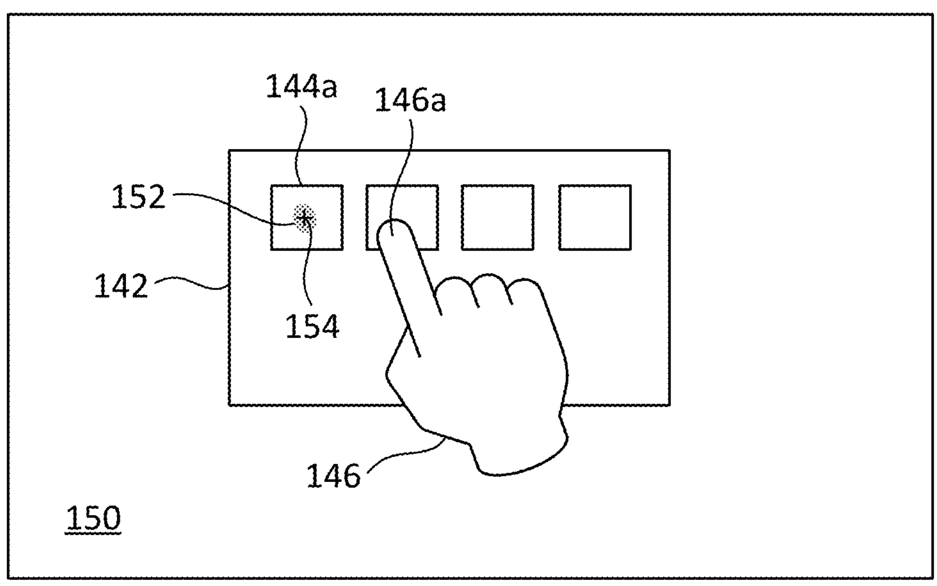
Figure 3D:
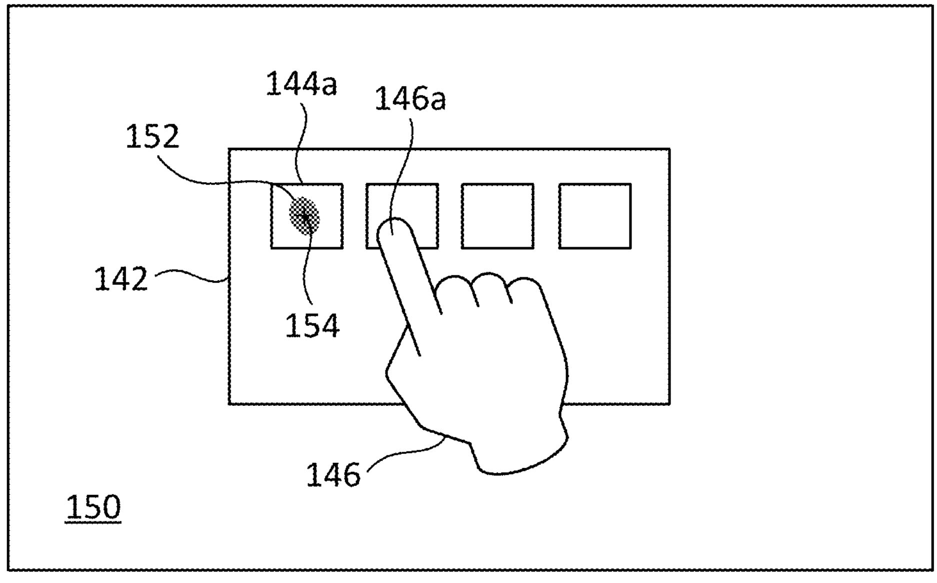

At step 203, the process 200 determines a location of the contact relative to the virtual user interface 142 using thermal data sensed by the thermal sensors 122. The process 200 may analyze the thermal data received from the thermal sensors 122 to identify a temperature differential change within the portion 152 of the surface 150. Based on the analysis of the thermal data, the process 200 determine a location 154 on the surface 150 that corresponds to the portion 152 of the surface 150 where the temperature differential change occurred (e.g., as shown in FIGS. 3C and 3D).

The process 200 may compare the location 154 to one or more predetermined locations that correspond to portions of the virtual user interface 142, such as one or more locations that bound the virtual user interface 142, respective locations that bound the control elements 144, or the like, for example. Based on comparing the location 154 with the one or more predetermined locations that correspond to the virtual user interface 142, the process 200 may associate the location 154 with a control element 144*a* of the control elements 144, for example by mapping the location 154 as approximate to the control element 144*a*, such as within or adjacent to a predefined boundary of the control element 144*a*. Based on mapping the contact of the finger keypoint 146*a* at the location 154 to the control element 144*a*, the process 200 determines that the user 110 intended to perform an interaction with the control element 144*a*.

At step 204, the process 200 determines a type of interaction associated with the contact using thermal data sensed by the thermal sensors 122. Types of interaction between at least a portion of the user 110 (e.g., a finger associated with the finger keypoint 146*a*) and the surface 150 may include, for example, a tap of the surface 150, a touch of the surface 150, or another gesture indicated by contact between at least a portion of the user 110 and the surface 150. The process 200 determines the type of interaction based on analysis of the thermal data, for example including heat transfer that results in the temperature differential change, for example.

In some implementations, determining the type of interaction includes analyzing thermal data received from the thermal sensors 122 to determine a duration of time that heat transfer resulting from the contact is sensed to identify the contact as at least one of a tap on the surface 150 or a touch of the surface 150. To illustrate, a duration of time during which the thermal sensors 122 sense heat transfer between at least a portion of the user 110 (e.g., a finger associated with the finger keypoint 146*a*) and the portion 152 of the surface 150 is determined by analysis of thermal data by the process 200.

A duration of time during which heat transfer associated with the contact is sensed of about 125 milliseconds or less indicates brief contact between the surface 150 and the one or more portions of the user 110, followed by immediate withdrawal from the surface 150. Brief contact may be identified as a tap interaction type, a click interaction type, or another type of brief, or quick, interactive gesture. A brief contact may also be indicated by a rapid rise and/or fall in temperature differential, for example between the portion of the user 110 and the surface 150.

A duration of time during which heat transfer associated with the contact is sensed of about 500 milliseconds or longer may indicate prolonged contact between the surface 150 and the one or more portions of the user 110. Prolonged contact with the surface 150 may be identified as a touch of the surface 150. A prolonged contact may also be indicated by a sustained change in temperature differential, for example between the portion of the user 110 and the surface 150.

A variety of interaction types may be associated with touches of the surface 150. For example, a touch in which at least a portion of the user 110 remains at a fixed location for the duration of time may be identified as a touch and hold interaction type. A touch in which the one or more portions of the user 110 move from a first location on the surface 150 to one or more other locations on the surface 150 while the contact is maintained may be interpreted as a drag interaction type, a swipe interaction type, a pinch interaction type, or another type of prolonged interactive gesture.

In some implementations, determining the type of interaction includes analyzing thermal data received from the thermal sensors 122 to determine a characteristic of a heat signature associated with the contact to identify the contact as at least one of a tap on the surface 150 or a touch of the surface 150.

A first example heat signature of a portion of the surface 150 generated as contact between a portion of the user 110 (e.g., a finger associated with the finger keypoint 146*a*) and the portion 152 of the surface 150 ceases is shown in FIG. 3C. The heat signature includes an indicator of the contact in the form of an oval-shaped area that substantially corresponds to the portion 152. The indicator may have one or more characteristics that indicate brief contact between the surface 150 and a portion of the user 110, which may be identified as a tap interaction type, a click interaction type, or another type of brief, or quick, interactive gesture. A first example characteristic is a color of the oval-shaped that indicates a change in the temperature differential at the portion 152. The color is indicative of a temperature differential change that is associated with a brief duration of contact. A second example characteristic is a size of the oval-shaped area. The size of the oval-shaped area is indicative of a brief duration of contact.

A second example heat signature of a portion of the surface 150 generated as contact between a portion of the user 110 (e.g., a finger associated with the finger keypoint 146*a*) and the portion 152 of the surface 150 ceases is shown in FIG. 3D. The heat signature includes an indicator of the contact in the form of an oval-shaped area that substantially corresponds to the portion 152. The indicator may have one or more characteristics that indicate prolonged contact between the surface 150 and a portion of the user 110, which may be identified as a touch interaction type. A first example characteristic is a color of the oval-shaped that indicates a change in the temperature differential at the portion 152. The color is indicative of a temperature differential change that is associated with a prolonged duration of contact. A second example characteristic is a size of the oval-shaped area. The size of the oval-shaped area is indicative of a prolonged duration of contact.

At step 205, the process 200 may optionally provide information related to the location of the contact and the type of interaction to an application, such as an application executing on the device 120. For example, an application executing on the device 120 may be in communication with the process 200, such that the process 200 can provide information related to inputs of the user 110, for example via interactions with the virtual user interface 142, to the application.

In accordance with the illustrated implementation, the virtual user interface 142 is depicted as being displayed on a planar surface of a table or desk within an indoor environment. However, the computing environment 100 is not limited to use on planar surfaces in favorable lighting environments (e.g., indoors). For example, the ability of the computing environment 100 to perform its functions based on thermal data enables it to display virtual user interfaces on non-planar surfaces and in a wide range of lighting environments while maintaining robust, precise surface tap and touch localization. The computing environment 100 enables the display of virtual interfaces on planar surfaces, non-planar surfaces, in outdoor environments, in low-light environments, in the presence of glare, in dynamic lighting scenarios, or a combination thereof, while maintaining accuracy of hand pose monitoring and providing precise surface tap and touch localization.

Examples of non-planar surfaces on which the computing environment 100 is capable of providing robust, precise surface tap and touch localization for virtual interfaces include curved surfaces, terrain surfaces (e.g., objects in a natural landscape), organic surfaces, architectural surfaces, and so on. Additionally, the computing environment 100 is capable of providing robust, precise surface tap and touch localization for virtual interfaces displayed on surfaces of the user 110. To illustrate, in some implementations, the computing environment 100 may display a virtual interface on a material covering a portion of the user's body, such as clothing, an accessory, or the like. In such an implementation, a portion of the user 110, such as the hand 111, that is monitored by the process 200 for tap and touch interactions with a virtual user interface, may be referred to as a first portion of the user 110, and the surface on the user 110 on which the virtual user interface is displayed and resides may be referred to as a second portion of the user 110.

Figure 4:
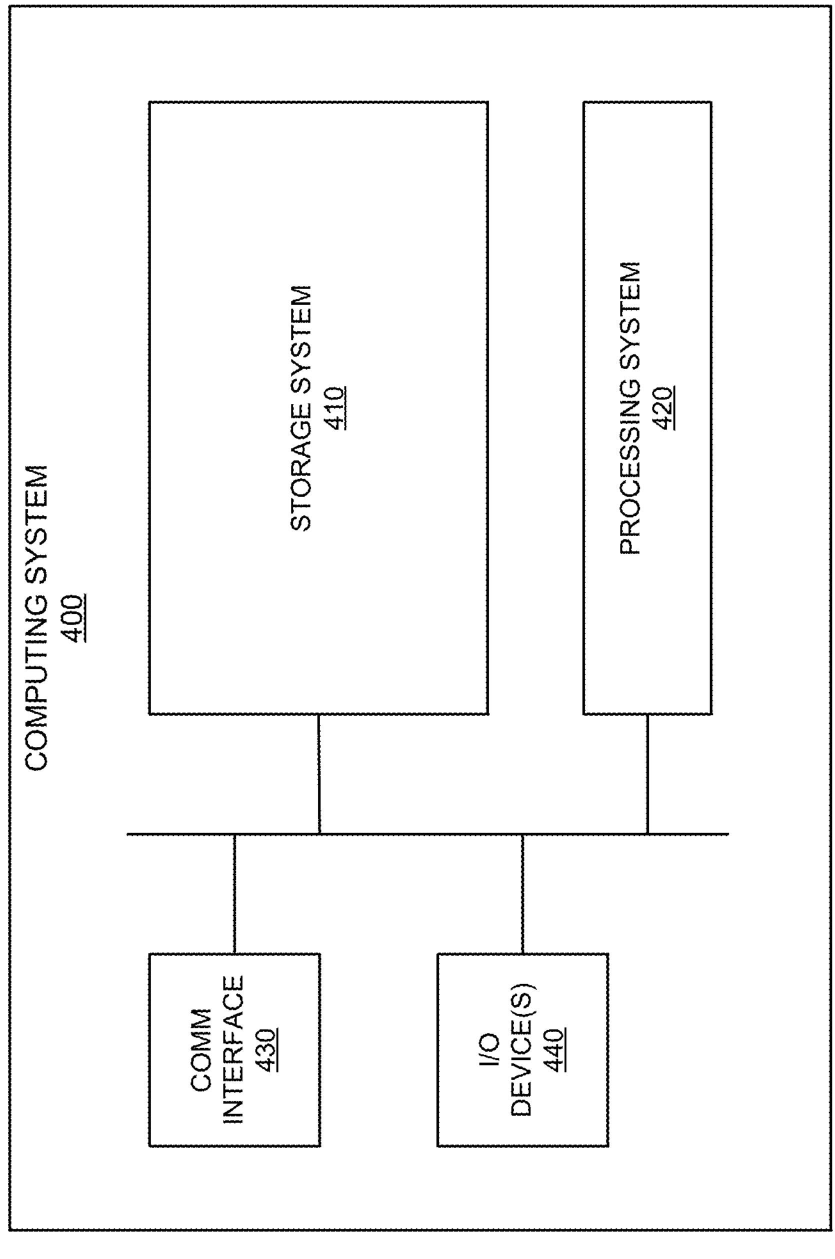
FIG. 4 is a block diagram of an example of a computing system for surface tap and touch localization in accordance with the present disclosure.

FIG. 4 illustrates a computing system 400 to provide surface tap and touch localization for virtual interfaces displayed on surfaces according to an implementation. Computing system 400 represents any apparatus, computing system, or systems with which the various operational architectures, processes, scenarios, and sequences are disclosed herein for providing surface tap and touch localization for virtual interfaces displayed on surfaces can be implemented. Computing system 400 can be provided as an AR device, an XR device, a wearable device, or another computing device capable of the operations described herein. For example, the computing system 400 may be implemented as the device 120.

As shown, the computing system 400 includes a storage system 410, a processing system 420, a communication interface 430, and input/output (I/O) device(s) 440. The processing system 420 is operatively linked to the communication interface 430, the I/O device(s) 440, and the storage system 410. In some implementations, the communication interface 430 and/or the I/O device(s) 440 may be communicatively linked to the storage system 410. The computing system 400 may further include other components such as a battery and an enclosure that are not shown for clarity.

The communication interface 430 includes components that communicate over communication links, such as network cards, ports, radio frequency, processing circuitry (and corresponding software), or some other communication devices. The communication interface 430 may be configured to communicate over metallic, wireless, or optical links. The communication interface 430 may be configured to use Time Division Multiplex (TDM), Internet Protocol (IP), Ethernet, optical networking, wireless protocols, communication signaling, or some other communication format-including combinations thereof. The communication interface 430 may be configured to communicate with external devices, such as servers, user devices, or other computing devices.

The I/O device(s) 440 may include peripherals of a computer that facilitate the interaction between the user 110 and the computing system 400. Examples of the I/O device(s) 440 may include keyboards, mice, trackpads, monitors, displays, printers, cameras, microphones, external storage devices, sensors, and the like. In some implementations, the I/O device(s) 440 includes at least one thermal imaging camera configured to capture images associated with the physical environment. In some implementations, the I/O device(s) 440 includes a see-through or video pass-through display providing a view of the physical environment, such as the display 126. In some examples, the display can give or show virtual interfaces that are enabled for interaction via tap and touch by the user 110. In some implementations, the computing system 400 can include at least one camera, such as an RGB camera and/or a depth camera that captures image data, for example related to a pose of a portion of the user 110, such as a hand.

The storage system 410 may include volatile and nonvolatile, removable, and non-removable media implemented in any method or technology for storage of information, such as computer-readable instructions, data structures, program modules, or other data. The storage system 410 may be implemented as a single storage device but may also be implemented across multiple storage devices or sub-systems. The storage system 410 may include additional elements, such as a controller to read operating software from the storage systems. Examples of storage media (also referred to as computer-readable storage media or a computer-readable storage medium) include random access memory, read-only memory, magnetic disks, optical disks, and flash memory, as well as any combination or variation thereof, or any other type of storage media. In some implementations, the storage media may be non-transitory. In some instances, at least a portion of the storage media may be transitory. In no case is the storage media a propagated signal.

The processing system 420 can include microprocessor circuitry (e.g., at least one processor) and other circuitry that retrieves and executes operating software (i.e., program instructions) from the storage system 410. The processing system 420 may comprise the processing system 128. In some implementations, the processing system 420 can include external computing resources, such as those provided by another device in communication with the computing system 400, cloud processing resources, or the like that are accessible to the computing system 400 via the communication interface 430.

The processing system 420 may be mounted on a circuit board that may also hold the storage system 410. Operating software of the storage system 410 may include computer programs, firmware, or some other form of machine-readable program instructions. The operating software on the storage system 410 may further include an operating system, utilities, drivers, network interfaces, applications, or some other type of software. When read and executed by processing system 420, the operating software on the storage system 410 directs the computing system 400 to operate as described herein. In at least one implementation, the operating software can provide the process 200. The operating software can provide or cause at least one processor to manage actions associated with physical objects as described herein.

In at least one implementation, the processing system 420 receives thermal data, such as thermal imaging data, from a thermal sensor of the I/O device(s) 440. The processing system 420 analyzes the thermal data to determine a location of contact between a portion of a user and a surface relative to a virtual interface displayed on the surface, and to determine a type of interaction associated with the contact. In some implementations, the processing system 420 provides information related to the location of the contact and the type of interaction to an application, for example via the communication interface 430.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data, such as information related to portions of a user's body and/or surrounding environment, may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

It should be appreciated that logic flows depicted in the figures, such as the process 200 shown in FIG. 2, do not require the particular order shown, or sequential order, to achieve desirable results. In addition, other steps may be provided, or steps may be eliminated, from the described flows, and other components may be added to, or removed from, the described systems. Accordingly, other implementations are within the scope of the claims.

What is claimed is:

1. A method comprising:
- determining a pose of a portion of a user relative to a surface, the surface associated with a virtual interface generated by a device worn by the user;
- receiving thermal data indicating contact between the portion of the user and a portion of the surface;
- determining a location of the contact relative to the virtual interface using the thermal data; and
- determining whether a type of interaction associated with the contact corresponds to a tap on the surface or a touch of the surface, using the thermal data.

2. The method of claim 1, wherein determining the location of the contact and determining whether the type of interaction corresponds to a tap on the surface or a touch of the surface includes analyzing the thermal data to determine a change in a temperature differential between the portion of the user and the surface at the location, the change in the temperature differential sensed by a thermal sensor of the device.

3. The method of claim 2, wherein determining whether the type of interaction corresponds to a tap on the surface or a touch of the surface further includes analyzing the thermal data to determine a duration of time during which heat transfer resulting from the contact occurs.

4. The method of claim 2, wherein determining whether the type of interaction corresponds to a tap on the surface or a touch of the surface further includes analyzing the thermal data to determine a characteristic of a heat signature associated with the contact.

5. The method of claim 1, wherein the thermal data includes thermal imaging data sensed by a thermal sensor of the device.

6. The method of claim 1, wherein the portion of the user is a first portion of the user, and wherein the surface resides on a second portion of the user that is different from the first portion.

7. The method of claim 1, wherein the surface is non-planar.

8. A computing system comprising:
- a computer-readable storage media;
- at least one processor operatively coupled to the computer-readable storage media; and
- program instructions stored on the computer-readable storage media that, when executed by the at least one processor, direct the at least one processor to perform a method, the method comprising:
  - determining a pose of a portion of a user relative to a surface, the surface associated with a virtual interface generated by a device worn by the user;
  - receiving thermal data indicating contact between the portion of the user and a portion of the surface;
  - determining a location of the contact relative to the virtual interface using the thermal data; and
  - determining whether a type of interaction associated with the contact corresponds to a tap on the surface or a touch of the surface, using the thermal data.

9. The computing system of claim 8, wherein determining the location of the contact and determining whether the type of interaction corresponds to a tap on the surface or a touch of the surface includes analyzing the thermal data to determine a change in a temperature differential between the portion of the user and the surface at the location, the change in the temperature differential sensed by a thermal sensor of the device.

10. The computing system of claim 9, wherein determining whether the type of interaction corresponds to a tap on the surface or a touch of the surface further includes analyzing the thermal data to determine a duration of time during which heat transfer resulting from the contact occurs.

11. The computing system of claim 9, wherein determining whether the type of interaction corresponds to a tap on the surface or a touch of the surface further includes analyzing the thermal data to determine a characteristic of a heat signature associated with the contact.

12. The computing system of claim 8, wherein the thermal data includes thermal imaging data sensed by a thermal sensor of the device.

13. The computing system of claim 8, wherein the portion of the user is a first portion of the user, and wherein the surface resides on a second portion of the user that is different from the first portion.

14. The computing system of claim 8, wherein the surface is non-planar.

15. A non-transitory computer-readable storage medium having program instructions stored thereon that, when executed by at least one processor, direct the at least one processor to perform a method comprising:

determining a pose of a portion of a user relative to a surface, the surface associated with a virtual interface generated by a device worn by the user;

receiving thermal data indicating contact between the portion of the user and a portion of the surface;

determining a location of the contact relative to the virtual interface using the thermal data; and determining whether a type of interaction associated with the contact corresponds to a tap on the surface or a touch of the surface, using the thermal data.

16. The non-transitory computer-readable storage medium of claim 15, wherein determining the location of the contact and determining whether the type of interaction corresponds to a tap on the surface or a touch of the surface includes analyzing the thermal data to determine a change in a temperature differential between the portion of the user and the surface at the location, the change in the temperature differential sensed by a thermal sensor of the device.

17. The non-transitory computer-readable storage medium of claim 16, wherein determining whether the type of interaction corresponds to a tap on the surface or a touch of the surface further includes analyzing the thermal data to determine a duration of time during which heat transfer resulting from the contact occurs.

18. The non-transitory computer-readable storage medium of claim 16, wherein determining whether the type of interaction corresponds to a tap on the surface or a touch of the surface further includes analyzing the thermal data to determine a characteristic of a heat signature associated with the contact.

19. The non-transitory computer-readable storage medium of claim 15, wherein the thermal data includes thermal imaging data sensed by a thermal sensor of the device.

20. The non-transitory computer-readable storage medium of claim 15, wherein the portion of the user is a first portion of the user, and wherein the surface resides on a second portion of the user that is different from the first portion.

* * * * *